United States Patent

[11] 3,590,644

[72] Inventor: Max Kuspert
 Markt, 46 Walders hof, Germany
[21] Appl. No. 825,201
[22] Filed May 16, 1969
[45] Patented July 6, 1971
[32] Priority May 21, 1968
[33] Germany
[31] P 17 50 637.5

[54] THREADED SPINDLE AND SLEEVE MEANS
 10 Claims, 2 Drawing Figs.
[52] U.S. Cl. .................................................. 74/57
[51] Int. Cl. .............................................. F16h 25/12
[50] Field of Search .................................... 74/25, 57, 424.8

[56] References Cited
UNITED STATES PATENTS

| | | | |
|---|---|---|---|
| 2,664,866 | 1/1954 | Fluke | 74/57 |
| 2,940,322 | 6/1960 | Uhing | 74/25 |
| 3,178,949 | 4/1965 | Hug | 74/25 |

Primary Examiner—William F. O'Dea
Assistant Examiner—Wesley S. Ratliff, Jr.
Attorney—Jacobi, Davidson, Lilling & Siegel ABSTRACT: There is disclosed a threaded spindle and sleeve means including an externally threaded spindle means, a sleeve means surrounding the same and means for guiding the rotary and translatory movements of the spindle means relative to the sleeve means comprising at least one rolling contact bearing unit including inner and outer races, disposed to lie in a plane oblique to the axis of the spindle with the outer race secured in the interior of the sleeve means and the inner race engaging the thread of the spindle.

PATENTED JUL-6 1971

INVENTOR.
MAX KUSPERT

BY
Jacobi, Davidson & Klein

THREADED SPINDLE AND SLEEVE MEANS

BACKGROUND OF THE INVENTION

The present invention relates to a new and improved threaded spindle and sleeve means in which the rotational and translatory movement of the threaded spindle relative to its surrounding supporting sleeve is guided by bearing means disposed between the sleeve and spindle.

Ordinary axially movable screws having trapezoid or rectangular shaped threads which engage in corresponding threads in associated nuts can have friction losses up to 85 percent of their drive output. This wasteful transfer of force and motion results in excessive wear and a great rise in temperature. Therefore externally threaded spindles or screws have been devised which are rotatably guided in associated internally threaded sleeves or nuts by rolling contact bodies disposed directly between said nuts and spindles in order to obtain conversions of motion which are of substantially easier action and almost friction-free on account of the slight rolling friction. This increases the life of the threaded spindles and also makes it possible to convert a translatory motion into a rotary motion even when the spindle thread possesses only slight pitch.

These types of threaded spindles using ball bearings require, for example, semicircular and precisely correspondingly shaped thread grooves in both the spindle and nut, with the balls circulating in said grooves. In this way, the balls carry out half of the relative motion between the spindle and the nut and therefore they necessarily emerge in the axial direction of motion at the end of the nut from the interaction between nut and spindle. Special return channels ensure that the balls reenter the loaded ball path between nut and spindle at the other end of the bearing track. Other solutions provide for plural ball paths which are each limited to one revolution of the spindle or screw relative to the nut. This makes it possible that the ball return channel can be limited to one length of the thread pitch. This single return of the rolling contact bodies is also provided in other known arrangements employing rollers equipped with grooves in place of balls, said rollers rolling off as planetary bodies between the thread grooves of the nut and spindle and which must be moved back by the amount of one pitch after each revolution within the nut. In all of these known arrangements, it is inevitable that the balls or rollers are periodically subjected to a sudden change between the loaded rolling path and the load-free return which becomes especially noticeable in spindle guidances having very little tolerance or which are preloaded in that one can observe a jerking sequence of the relative motion between nut and spindle. As a rule, the play adjustment or preloading, respectively, is achieved by radially dividing into two the nut and by allowing axial displacement of the nut portions thus obtained.

A further solution provides for disposing planetating rollers between the threaded spindle and the nut and providing such rollers with a single external thread engaging with the threads of both the nut and spindle. The threading of the nut and spindle has a number of threads per unit of length which must correspond to the number of or at least to half the number of the externally threaded rollers. The interaction of this plurality of thread structures on the surfaces of the nut, the spindle and the planetating rollers requires extremely high precision in production which makes it very problematical to replace rolling contact bodies as they wear out. In addition such threaded rollers must also have exact guidance relative to the nut by way of a mesh in order to enable the rollers to roll off accurately and free from crossing.

The drawback which is common to all of these solutions is that the construction and particularly the precision required in manufacture due to the necessity of accurately coordinating the various threads with one another is very expensive. This means that an economical replacement of worn out parts is hardly feasible.

SUMMARY OF THE INVENTION

Hence, the object of the invention is to create a rotary and axially movable threaded spindle means which is of simple and low cost construction, retains easy action, allows replacing substantially all inexpensive parts subjected to wear and tear, enables smooth operation, and avoids the employment of plural threadings which have to be precisely coordinated with one another.

The inventive solution of the objects is attained by providing at least one rolling contact bearing unit surrounding the threaded spindle or screw and disposed obliquely in relation to the latter's rotational axis, with the outside ring or race of said rolling contact bearing unit being secured in a supporting sleeve and its inner ring or race engaging with a single or multiple thread of the spindle.

The term rolling contact bearing unit refers primarily to mass produced and commercially available roller or ball bearings, in particular ball bearings having grooved races which are particularly inexpensive on account of their fabrication in very large quantities. In a particularly advantageous manner, the inner ring or race has approximately diagonally opposite edges inserted into the thread groove of the spindle. The axial spindle forces are thus taken up by the roller bearing unit in both directions of the spindle's longitudinal motion. If a decision has been made to select a bearing unit having definite measurements and what its oblique position in the sleeve should be, which preferably is at an angle of 45°, then all that remains to be done is to match the spindle thread to the measurements thus selected.

Depending upon the axial load to be assumed, it is possible to provide plural bearing units in one or more supporting sleeves, with the individual bearing units mounted in parallelism or offset with respect to their oblique position relative to the associated supporting sleeve.

In order to achieve a symmetrical loading of the spindle it is possible, for example, to mount two bearing units offset by 180° with respect to their oblique position relative to the supporting sleeve, or four bearing units offset by 90° relative to one another.

The great economy of this solution directed to a rotary threaded spindle, aside from using commercially available rolling contact bearing units, is further increased in that, it is possible, without anything further, to replace worn out bearing units by new ones by using a longitudinally split support sleeve or jacket arrangement. As in the known solutions directed to threaded spindle accommodating nuts, here also a support sleeve or jacket means can include two longitudinally split and relatively axially displaceable sleeve components each housing at least one bearing unit. By virtue of such an arrangement, a precise adjustment for play or for preloading respectively, can be achieved.

In most cases, there will not be used a sufficient number of bearing units mounted in offset fashion against one another and relative to their oblique position as to ensure radial guidance of the spindle. Therefore, the invention also provides roller bodies which bear against the spindle surface and which are mounted parallel to the axis of said spindle surface. Such roller bodies prevent radial displacement of the spindle and ensure engagement of the one or more inner races or rings of the bearing units. Further when arranging more than one bearing unit, the mounting thereof in the sleeve to assure exact engagement with the threaded shaft is facilitated if the outer race or ring is first inserted loosely into an enlarged recess or groove in the supporting sleeve and securing it in its precise position only after inserting and radially supporting the spindle by casting the outer race in place with a suitable plastic material, in particular a synthetic plastic resin having capillary action.

Next to economic utilization of inexpensive rolling contact bearing units and their replaceability, the present invention is also characterized by the fact that the known internally threaded nut has been replaced by a simple supporting sleeve means, comprising two parts and it only being necessary to provide the internal groove or recess arrangement for accommodating the bearing unit (s).

It is a further characteristic of the invention that the inner race bearing against the thread flanks guides the rotary bodies of the bearing unit to a continuously proceeding changeover between the loaded and unloaded condition, as a result of which a completely smooth spindle motion can be obtained.

BRIEF DESCRIPTION OF THE DRAWINGS

Additional and more specific objects and advantages will become apparent from the following description taken in connection with the accompanying drawings in which.

DETAILED DESCRIPTION OF THE PREFERRED EMBODIMENTS

Figure 1:
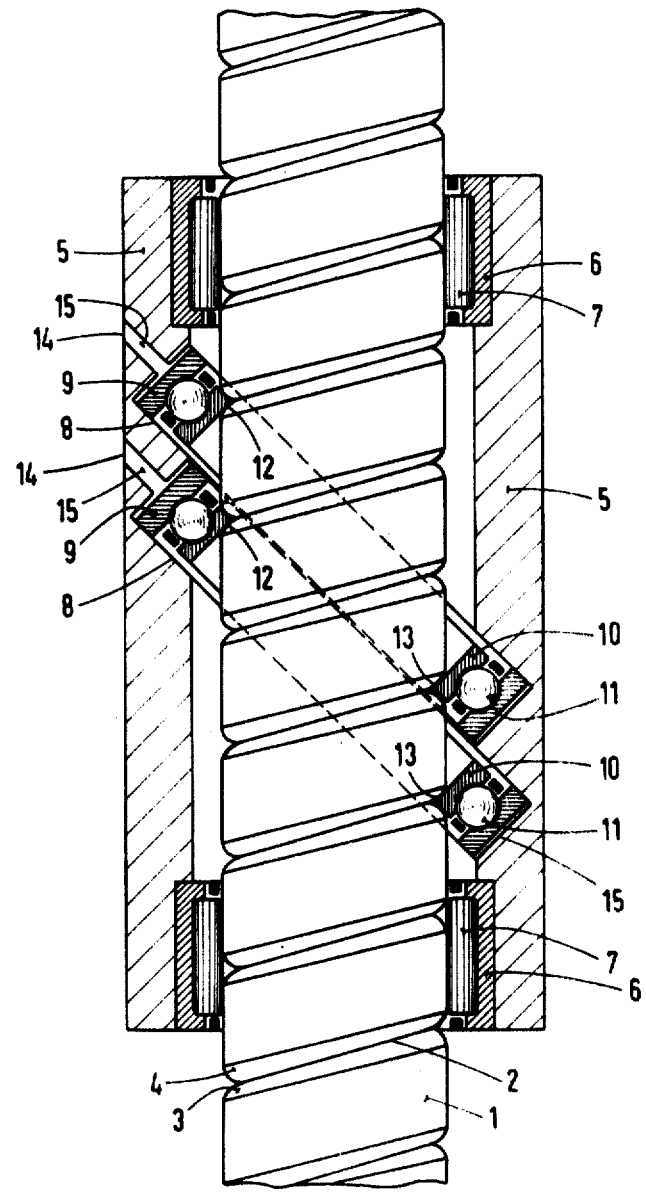
FIG. 1 is a longitudinal sectional view illustrating one form of threaded spindle and supporting sleeve means of the invention.

FIG. 1 illustrates an arrangement including a hardened steel spindle or shaft 1 having a continuous external thread recess 2 having the surfaces of the opposite flanks 3 and 4 shaped spherically. Around the shaft is disposed a longitudinally split sleeve means 5. The opposite ends of the sleeve means are recessed to accommodate the housings 6 of a plain roller bearing means, the rollers 7 of which contact the periphery of the spindle on the cylindrical surface area thereof. This end bearing relationship with the rollers parallel to the axis of the spindle radially guides and supports the spindle against radial displacement. Between the two end roller bearing means are mounted two identical ball bearing units 8. Each unit includes outer and inner circumferentially grooved races or rings 9 and 10 accommodating a series of balls 11 and their associated retainers. The inner surfaces of the split sleeve parts 5 are grooved to provide recesses to accommodate the outer races 9 of the two ball bearing units 8 so that they are parallel to one another and have their respective rotational axes obliquely disposed at an angle of 45° with respect to the axis of spindle 1. The inner races or rings 10 have approximately, diagonally, opposite roll-off points or regions 12 and 13 engaging flanks 3 and 4 of axially spaced thread groove portions. The measure for the possible pitch rises or variations of the spindle thread are determined by the approximately diagonal distance between roll-off points or regions 12 and 13 of the inner race or ring and by the angular position of the ball bearing unit 8 relative to the spindle axis. In this case, the distance between the roll-off points or regions 12 and 13, taken in relation to the spindle axis has a length of 2.5 pitch. This figure can be changed within certain limits by a whole-numbered multiple of the pitch depending upon the ratio required between the rotational and translatory motion of the spindle. The spherically shaped thread flanks 3 and 4 are ground to fit the so-called flank engaging distance between roll-off points or regions 12 and 13 in tight fit relation to the inner race or ring.

If it were initially desired that the outer rings or races be housed in the grooves of the sleeve means 5 in a tight fit relation, i.e. free of play, than the race accommodating groove would have to be precision machined which would require unnecessary precision work. Therefore, according to one characteristic feature of the invention, the grooves or recesses for the outer races are shaped to accommodate these races with a certain tolerance so that the outer races or rings can properly accommodate themselves to the position of the spindle determined by the radial bearing means. In this unloaded condition, the space between the outer race or rings 9 and the grooves or recesses in sleeve means 5 is filled with a pourable, capillary flowable mass 15 of synthetic resin through inlet passages 14 so that the outer races or rings assume and are held in the required precise position relative to the support sleeve. This procedure is particularly followed when several ball bearing units are utilized.

When the spindle 1 rotates, the inner race or ring rolls along flanks 3 and 4 along roll-off points or regions 12 and 13 and transfers the motion via balls 11 to the outer race or ring and therewith to the support sleeve means 5, so that on the whole there arise only rolling contact movements which have a very low roll-off resistance.

In the form illustrated in FIG. 2, the spindle 1 is again provided with a single continuous thread groove 2 having spherically shaped flanks 3 and 4. The spindle is mounted in a support sleeve means including an outer jacket or sleeve 16 and two inner jackets or sleeves 17 and 18 mounted within the outer jacket for axial displacement relative thereto. The roller bearing means 6 and 7 are mounted at the outer ends of the respective inner sleeves 17 and 18. The support sleeve 17 mounts a ball bearing unit 8 in the same relationship as FIG. 1, if only one of the ball bearing units were utilized. The support sleeve 18 carries a similar ball bearing unit 8' which is mounted by having been rotated 180° relative to its oblique position with respect to the ball bearing unit mounted in sleeve 17. This rotation can be visualized if one would turn the sleeve 17 by 180° relative to the outer sleeve 16 and the stationary inserted spindle 1.

Figure 2:
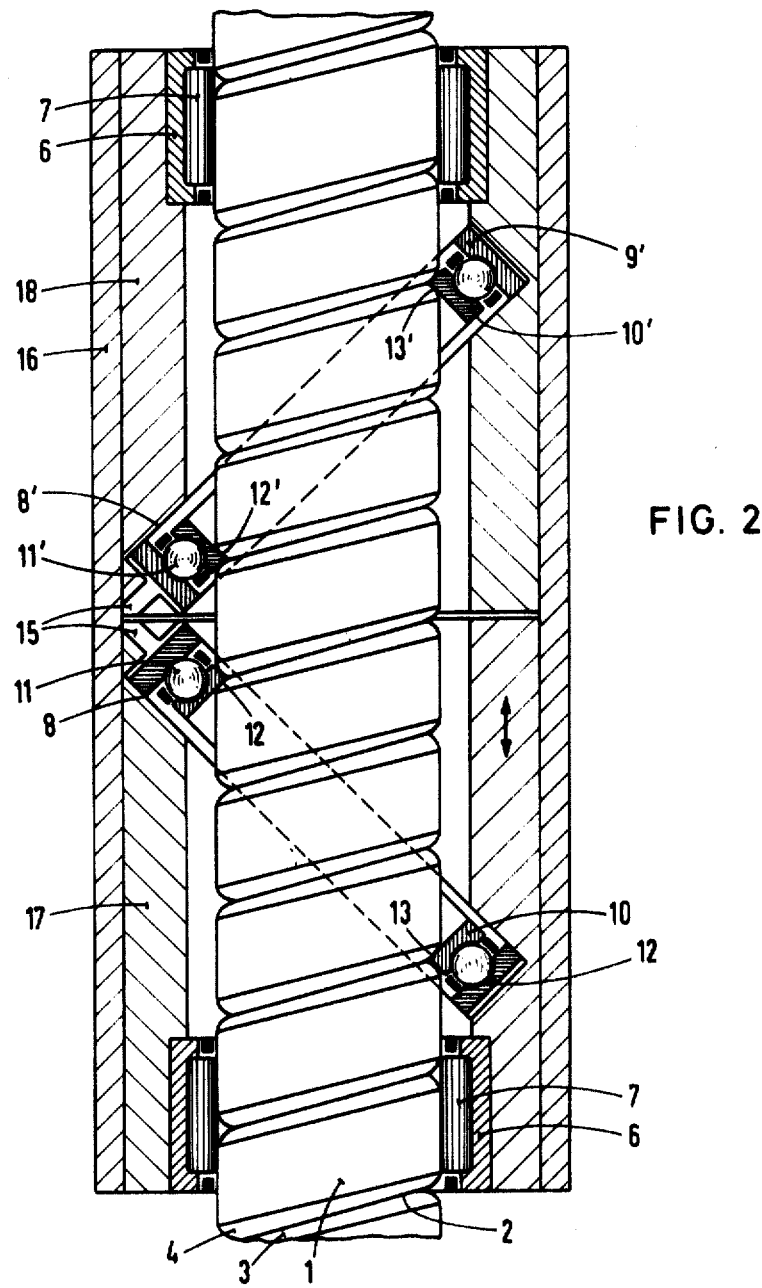
FIG. 2 is a similar view illustrating a modified form of the invention, permitting an adjustment for play or preloading, respectively.

The arrangement of the ball bearing units in FIG. 2 has the advantage that the axial forces or loads taken up by the inner races or rings of the bearing units distribute themselves symmetrically onto and along the spindle. If, for example, the axial force is exerted from right to left, then the load is assumed by the inner ring 10' of bearing unit 8' at roll-off point or region 13. If the axial force is exerted from left to right, then the load is assumed by the roll-off points or regions 12 and 13' of inner rings or races 10 and 10' of bearing units 8 and 8', respectively. Here again these roll-off points 12 and 13' are disposed diagonally across from one another relative to the circumference of the spindle.

It is to be readily understandable that axial displacement of sleeve components 17 and 28 toward one another provides for taking up play or preloading of the support elements, respectively, as against the spindle.

As illustrated, the bearing units 8 and 8' of FIG. 2 are held in position by the plastic mass 15 in the same manner as in FIG. 1.

The means to secure the split sleeve components together has not been shown since any arrangement suitable for the purpose and known in the art can be utilized. Further the means for effecting axial displacement of sleeve components 17 and 18 within the outer sleeve 16 has not been illustrated since any known means to accomplish this result can be utilized.

It is also possible to substantially enlarge the scope of the embodiments herein described. Moreover, the inventive concept also provides the possibilities of causing a rotation of an axially nondisplaceable sleeve means by a translating motion of a nonrotating spindle, as well as Providing other motion converting possibilities as are known from known friction poor spindle arrangements.

It is to be further pointed out that the teachings of this invention permit the utilization of particularly low height structures for the supporting sleeve means, i.e. the dimensions thereof transverse to the axis. As a result, it is especially feasible to replace spindle and nut arrangements in existing machinery with an arrangement following the teaching of this invention.

It is therefore clear that the present invention provides a combination of components including a sleeve means, spindle means having a thread groove and at least one commercially available rolling contact bearing unit surrounding the spindle means at an angle to the axis thereof. The bearing unit is secured within the sleeve means so that the inner race of the bearing unit engages the thread groove of the spindle at diagonally opposite roll-off points or regions of such inner race.

It should be apparent from the foregoing detailed description, that the objects set forth at the outset to the specification have been successfully achieved. ACCORDINGLY,

What I claim is:

1. A threaded spindle and sleeve means including an externally threaded spindle means, a sleeve means surrounding said spindle means, and means for guiding the rotary and translatory movements of said threaded spindle means relative to said sleeve means comprising at least one rolling contact bearing unit having inner and outer races, said bearing unit surrounding said threaded spindle means and being disposed obliquely to the axis of rotation of said threaded spindle means, said outer race being secured within said sleeve means and said inner race engaging with the thread of said threaded spindle means, said inner race including diagonally opposed roll-off points engaging the thread of said threaded spindle means.

2. A threaded spindle and sleeve means as claimed in claim 1 said rolling contact bearing unit being disposed at an angle of 45° with respect to the axis of rotation of said spindle means.

3. A threaded spindle and sleeve means as claimed in claim 1 having at least two rolling contact bearing units secured within said sleeve means with their axes of rotation parallel to one another.

4. A threaded spindle and sleeve means as claimed in claim 1 having at least two rolling contact bearing units secured within said sleeve means with their axes of rotation intersecting one another.

5. A threaded spindle and sleeve means as claimed in claim 1 and at least one continuous recess having opposite flanks defining the thread of said spindle means and said flanks being spherically shaped.

6. A threaded spindle and sleeve means as claimed in claim 1, said spindle means having a cylindrical surface between its threads, rolling contact bearing means disposed between said sleeve means and said cylindrical surface and said rolling contact bearing means extending parallel to the axis of said spindle means for radially guiding the same.

7. A threaded spindle and sleeve means including an externally threaded spindle means, a sleeve means surrounding said spindle means, and means for guiding the rotary and translatory movements of said threaded spindle means relative to said sleeve means comprising at least one rolling contact bearing unit having inner and outer races, said bearing unit surrounding said threaded spindle means and being disposed obliquely to the axis of rotation of said threaded spindle means, said outer race being secured within said sleeve means and said inner race engaging with the thread of said threaded spindle means, said sleeve means being longitudinally split.

8. A threaded spindle and sleeve means including an externally threaded spindle means, a sleeve means surrounding said spindle means, and means for guiding the rotary and translatory movements of said threaded spindle means relative to said sleeve means comprising at least one rolling contact bearing unit having inner and outer races, said bearing unit surrounding said threaded spindle means and being disposed obliquely to the axis of rotation of said threaded spindle means, said outer race being secured within said sleeve means and said inner race engaging with the thread of said threaded spindle means, said sleeve means comprising at least two sleeve sections, at least one rolling contact bearing unit secured within each section and said sections being constructed and arranged for relative axial displacement toward one another to permit adjustments for eliminating play and for preloading.

9. A threaded spindle and sleeve means including an externally threaded spindle means, a sleeve means surrounding said spindle means, and means for guiding the rotary and translatory movements of said threaded spindle means relative to said sleeve means comprising at least one rolling contact bearing unit having inner and outer races, said bearing unit surrounding said threaded spindle means and being disposed obliquely to the axis of rotation of said threaded spindle means, said outer race being secured within said sleeve means and said inner race engaging with the thread of said threaded spindle means, the interior of said sleeve means having at least one recess therein accommodating said outer race of said rolling contact bearing unit and a flowable casting mass having capillary action securing said outer race within said recess.

10. A threaded spindle and sleeve means including an externally threaded spindle means, a sleeve means surrounding said spindle means, and means for guiding the rotary and translatory movements of said threaded spindle means relative to said sleeve means comprising at least one rolling contact bearing unit having inner and outer races, said bearing unit surrounding said threaded spindle means and being disposed obliquely to the axis of rotation of said threaded spindle means, said outer race being secured within said sleeve means and said inner race engaging with the thread of said threaded spindle means, said threaded spindle means having a single continuous external groove defined by opposite spherically shaped flanks constituting a continuous thread of uniform pitch, said sleeve means having at least two recesses on the interior thereof, each including at least one continuous surface lying at an angle of 45° relative to the axis of said spindle means, at least two ball bearing units each including inner and outer races, said outer races being secured in said recesses and said inner races engaging said spherically shaped flanks at diagonally opposite roll-off points of said inner races at axially spaced portions of said spindle means.